Figure 1:
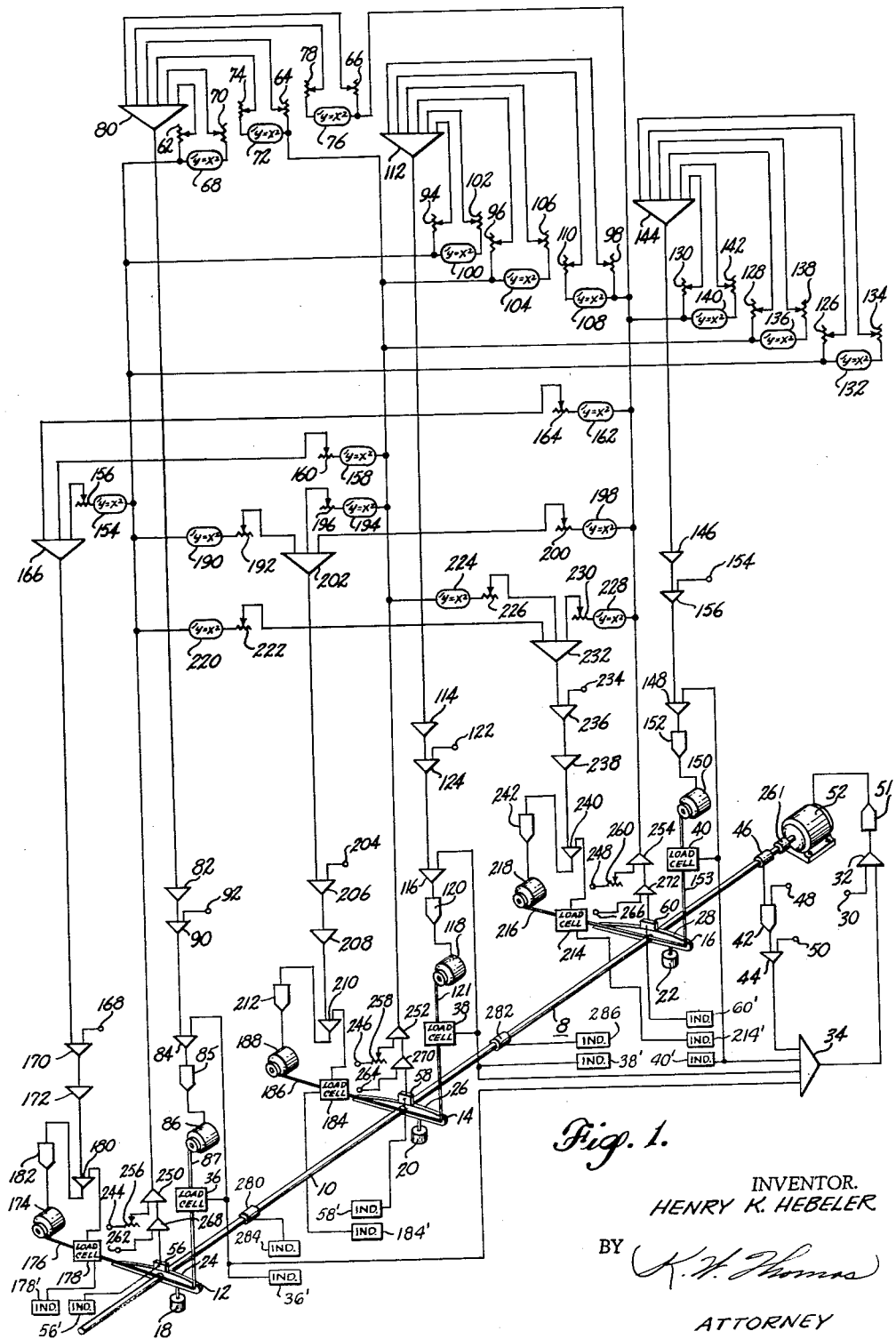

Feb. 27, 1962     H. K. HEBELER     3,022,662
APPARATUS FOR DETERMINING STRUCTURAL STRAIN CHARACTERISTICS
Filed Oct. 20, 1958     2 Sheets-Sheet 1

INVENTOR.
HENRY K. HEBELER
BY
ATTORNEY

INVENTOR.
HENRY K. HEBELER
BY
ATTORNEY

United States Patent Office 3,022,662
Patented Feb. 27, 1962

3,022,662
APPARATUS FOR DETERMINING STRUCTURAL STRAIN CHARACTERISTICS
Henry K. Hebeler, Seattle, Wash., assignor to Boeing Airplane Company, Seattle, Wash., a corporation of Delaware
Filed Oct. 20, 1958, Ser. No. 768,319
11 Claims. (Cl. 73—93)

This invention relates to computers and, more particularly, to aerolastic analog computers for determining the physical characteristics of an airplane under various operating conditions.

An elastic airplane, which is free to bend and twist, will experience different loads in flight than one which is not free to bend and twist. The amount that the airframe deforms is a function of the aerodynamic and inertial loads, and the aerodynamic loads are, in turn, a function of the deformation or change of angle of attack. This inner-action of elastic deformations and aerodynamic loads is the essence of the aerolastic problem. If the airplane is completed and flying, one can measure the loads and the extent of changes in angle of attack due to elasticity.

Prediction of aerolastic effects before the airframe is built is very difficult and becomes even more difficult as the geometry, structure, and aerodynamic theories become more complicated. Heretofore, the aeroelastic effects were usually determined mathematically. For instance, in designing a new airplane configuration a given plan configuration was determined. Once the plan configuration was determined a physical structure for the plane was assumed. Then the aerodynamic influence coefficients and the elastic influence coefficients were computed. These coefficients were then combined in an aerolastic solution to determine the adquacy of the assumed structure. However, with the advent of the low aspect ratio structures, for instance airplanes having low aspect ratio wings, it became extremely difficult if not impossible to calculate accurately the elastic influence coefficients.

A vertification of the above referred to computations can be obtained by placing a flexible test model in a wind tunnel to determine the loads on the airplane and the angle of attack under given operating conditions. However, this procedure has several drawbacks. For instance, owing to the small size of available wind tunnels and owning to the roughness of the tunnel it is extremely difficult if not impossible to properly instrument the model to obtain the desired information. If the instrumentation is placed external of the model this influences the aerodynamic characteristics of the model, thus giving inaccurate results. In addition, it is very difficult in a wind tunnel test to simulate the heat conditions that exist in hypersonic flight. Further, in a wind tunnel test it is difficult to obtain sufficient accuracy for structural analysis purposes.

From the foregoing it can be realized that it would be extremely valuable to have some means of obtaining an aerolastic solution without mathematically computing the elastic influence coefficients and without seeking a vertification of the solution in a limited wind tunnel test. In accordance with this invention it is possible to obtain just such a solution without first computing the elastic influence coefficients and without seeking a verification of the solution is a limited wind tunnel test.

An object of this invention is to provide for simulating the force or forces which would be applied to a deformable object if it were placed under various operating conditions to thereby determine one or more physical characteristics of the object.

Another object of this invention is to provide for obtaining an equilibrium state for a deformable object in which the magnitude of the deformation of the object is dependent upon the magnitude of the force applied to the object and the magnitude of the force is in turn dependent upon the magnitude of the deformation of the object.

A further object of this invention is to provide for applying the necessary control forces to an airplane or model thereof so as to maintain the airplane in equilibrium to thus enable the obtaining of the magnitude of these control forces and thereby enable a proper design of the airplane.

Still another object of this invention is provided for applying a maximum control deflection or force to a control station of a test model airplane while still maintaining equilibrium of the airplane, to thus enable a determination of the operating limits of the airplane such as speed, altitude and load factor.

A further object of this invention is to provide for determining the structural strains in an airplane or test model thereof when forces are so applied thereto as to simulate various operating conditions.

A still further object of this invention is to provide for determining the stability of an airplane or test model thereof when forces are so applied thereto as to simulate various operating conditions.

Another object of this invention is to provide for more accurately obtaining one or more of the physical characteristics of an airplane by being able to simulate various operating conditions of the airplane with a more adequate structural representation of the airplane.

An additional object of this invention is to provide for so simulating the forces which would be applied to an airplane test model if it were placed under various operating conditions that instrumentation can be placed on the exterior of the model without influencing the aerodynamic properties of the model.

A further object of this invention is to provide for simulating with respect to an airplane test model the temperature environment encountered by the airplane under various operating conditions.

Figure 2:
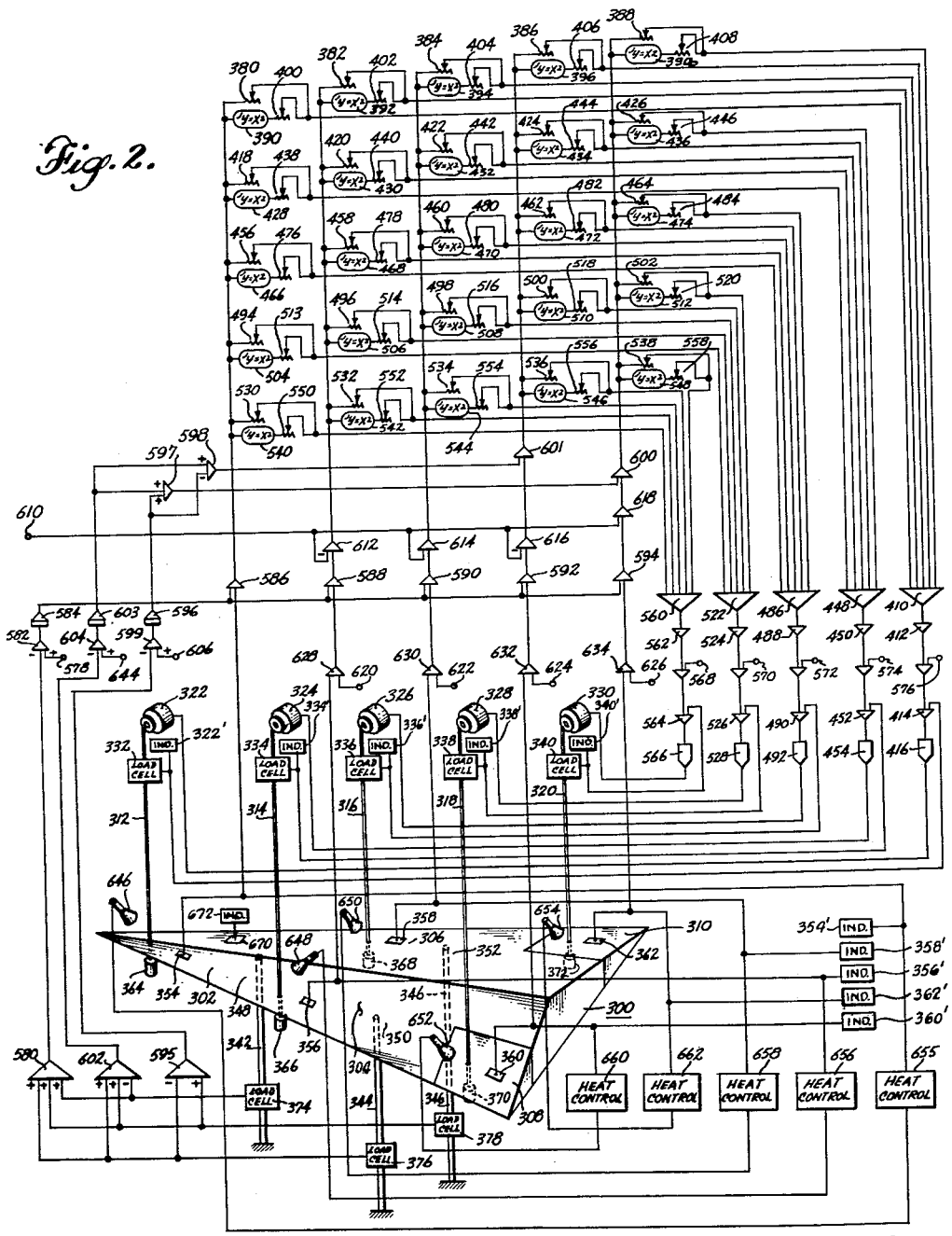

Other objects of this invention will become apparent from the following description when taken in conjunction with the accompanying drawings in which:

FIG. 1 is a schematic diagram of circuits and apparatus illustrating the application of this invention to a structure having a high aspect ratio, and FIG. 2 is a schematic diagram of apparatus and circuits illustrating the application of this invention to a structure having a low aspect ratio.

Referring to FIG. 1 there is illustrated an object or structure 8 representing one-half of an airplane wing having a high aspect ratio. The structure 8 has elastic characteristics corresponding to the wing structure that it represents. In general, the structure 8 comprises a spar 10 and a plurality of ribs 12, 14 and 16 which are spaced along the spar 10, the ribs 12, 14 and 16 being suitably secured to the spar 10 for rotary movement therewith. Since the spar 10 and the ribs 12, 14 and 16 are so constructed as to have the same elastic characteristics as the actual half wing that they represent, when lift forces are applied to the structure 8, the structure 8 deforms in the same manner as the actual wing structure.

In order to truly simulate the actual half wing structure, the structure 8 must not only have the same elastic characteristics as the actual wing structure but it must have the same weight proportionately in order to take into account inertia loads. Therefore, weights 18, 20 and 22 are hung from the ribs 12, 14 and 16, respectively, to supply the additional needed weight.

In operation, lifts $L_1$, $L_2$ and $L_3$ are applied to the regions 24, 26 and 28, respectively. The lifts $L_1$, $L_2$ and $L_3$ can be expressed in a power series as follows:

$$L_1 = [k_{11}\alpha_1 + k_{12}\alpha_2 + k_{13}\alpha_3 \ldots + c_{11}\alpha_1^2 + c_{12}\alpha_2^2 + c_{13}\alpha_3^2]q$$

$$L_2 = [k_{21}\alpha_1 + k_{22}\alpha_2 + k_{23}\alpha_3 \ldots + c_{21}\alpha_1^2 + c_{22}\alpha_2^2 + c_{23}\alpha_3^2]q$$

$$L_3 = [k_{31}\alpha_1 + k_{32}\alpha_2 + k_{33}\alpha_3 \ldots + c_{31}\alpha_1^2 + c_{32}\alpha_2^2 + c_{33}\alpha_{23}^2]q$$

In the above equations L represents the lift per station or region in pounds, $\alpha_i$ the angle of attack at $i$ in radians, $q$ the dynamic pressure in pounds per square feet, $k_{ij}$ the linear aerodynamic influence coefficient which gives the lift at $i$ due to unit angle deflection at $j$, and $c_{ij}$ the non-linear aerodynamic influence coefficient which gives the lift at $i$ due to the square of the angle of deflection at $j$.

The value for $q$ is mathematically determined once having assumed a given operating condition for the airplane. The aerodynamic influence coefficients $k_{ij}$ and $c_{ij}$ are theoretically determined quantities. However, L, the lift per station or region in pounds, and $\alpha_i$ the angle of attack at $i$ in radians, are unknown quantities and the apparatus of the subject invention solves for these unknowns.

If it is assumed that lifts $L_1$, $L_2$ and $L_3$ are applied to the regions 24, 26 and 28, respectively, of the structure 8, then the sum of the lifts $L_1$, $L_2$ and $L_3$ plus the lift effect of the tail section of the airplane, which will be described hereinafter, must equal one-half of the weight of the airplane in order to maintain the airplane in flight. Thus, in order to satisfy this flight condition a command signal representing one-half of the weight of the airplane, is applied to a terminal 30 which is electrically connected to the input of a comparator device or summer 32. Within the comparator device 32 a measure of the command signal is compared with a measure of the output signal from a summer 34 to produce an error signal, at the output of the comparison device 32, proportional to the difference between the command signal and the output signal from the summer 34. The input of the summer 34 is responsive to the output signals from sensing devices, specifically, load cells 36, 38 and 40, which output signals represent the lifts $L_1$, $L_2$ and $L_3$, respectively. In practice, the load cells 36, 38 and 40 can be, for instance, Wheatstone bridge resistive strain gages. Center-scale galvanometers 36′, 38′ and 40′ are suitably connected to the load cells 36, 38 and 40, respectively, in order to obtain an indication of the values of $L_1$, $L_2$ and $L_3$, respectively. Thus, the load cell 36 and associated galvanometer 36′ when combined constitutes measuring means. In like manner, the combination of the load cell 38 and the galvanometer 38′ and the combination of the load cell 40 and the galvanometer 40′ each constitutes measuring means. However, it is to be understood that if recording of the values of $L_1$, $L_2$ and $L_3$ is desired recording means (not shown) could be connected to the load cells 36, 38 and 40 instead of the indicating means 36′, 38′ and 40′. Further, depending upon the type of indicating or recording means connected to the load cells 36, 38 and 40, the load cells 36, 38 and 40 could be of a type other than the Wheatstone bridge resistive strain gage type. However, the load cell and its associated indicating or recording means would be referred to as a measuring means. As illustrated, the summer 34 is also responsive to the lift effect of the tail section of the airplane. Specifically, a dividing network 42 is connected in series circuit relationship with a summer 44 between the input of the summer 34 and the output of a strain gage 46 which is mounted on the spar 10 at the center line of the aircraft to measure the torque applied to the spar 10. In other words the strain gage is located at the wing root.

The lift influence of the tail section of the airplane can be expressed from the summation of moments about the point of location of the strain gage 46 by the equation $$L_{\text{tail}} = \frac{X_{cg}WT - L_{\text{wing}}X_1}{X_2}$$

where $X_{cg}$ represents the distance forward of the gage 46 to the center of gravity point of the airplane, WT the weight of the airplane, $L_{\text{wing}}$ the lift effected by the wing of the airplane, $X_1$ the distance forward of the gage 46 to the lift point on the wing, and $X_2$ the distance aft of the gage 46 to the lift point on the tail section of the airplane. In the above equation distances are considered positive toward the nose of the airplane, and lifts are considered positive in the upward direction.

Referring to FIG. 1, the output from the torque measuring strain gage 46 to the input of the divider network 42 is proportional to $L_{\text{wing}}X_1$ and a signal proportional to $X_2$ is applied to a terminal 48 which is electrically connected to the input of the divider network 42. Thus, the output from the divider network 42 is proportional to $$\frac{L_{\text{wing}}X_1}{X_2}$$

and this output is applied to the input of the summer 44. The computed value of $$\frac{X_{cg}WT}{X_2}$$

is applied to a terminal 50 which is electrically connected to the input of the summer 44. Thus, the summer 44 obtains an output from itself which is proportional to the difference between the input from the terminal 50 and the output from the dividing network 42, to thus apply to the input of the summer 34 a signal which is proportional to the lift effect of the tail section of the airplane.

A servo amplifier 51 is connected to be responsive to the output error signal from the comparator device 32 to thus control the operation of a servomotor 52. The base of the servomotor 52 is rigidly mounted and the spar 10 is disposed to be rotated by the servomotor 52. Thus, in operation the servomotor 52 restrains physical movement of that portion of the spar 10 which is nearest to the servomoter 52 and it likewise effects a change in the angular position of the spar 10 and the ribs 12, 14 and 16, to thereby change the angle of attack of the structure 8. As will be explained more fully hereinafter, the servomotor 52 continues to change the angle of attack of the structure 8 until an equilibrium position is reached in which the output error signal from the comparison device 32 is of zero magnitude.

In order to obtain signals proportional to $\alpha_1$, $\alpha_2$ and $\alpha_3$, and thus signals proportional to the angular position of the structure 8 at the regions 24, 26 and 28, respectively, sensing devices, specifically, accelerometers 56, 58 and 60 are suitably mounted on the ribs 12, 14 and 16, respectively, for rotary movement with the respective ribs 12, 14 and 16. Thus, the output signals from the accelerometers 56, 58 and 60 vary in accordance with the angular position of the structure 8 at the regions 24, 26 and 28, respectively. In practice, the accelerometers 56, 58 and 60 can be, for instance, Wheatstone bridge resistive strain gages. Center-scale galvanometers 56′, 58′ and 60′ are suitably connected to the accelerometers 56, 58 and 60, respectively, in order to obtain an indication of the angular position of the structure 8 at the regions 24, 26 and 28, respectively. However, it is to be understood that if recording of the values of $L_1$, $L_2$ and $L_3$ is desired recording means (not shown) could be connected to the accelerometers 56, 58 and 60 instead of the indicating means 56′, 58′ and 60′. Further, depending upon the circumstances, accelerometers 56, 58 and 60 could be of a type other than the Wheatstone bridge resistive strain gage type. Here again the combination of, for instance, the accelerometer 56 and associated indicating means 56′ or the combination of the accelerometer 56 and associated recording means (not shown) is referred to as measuring means.

As hereinbefore mentioned in the equation $$L_1 = [k_{11}\alpha_1 + k_{12}\alpha_2 + k_{13}\alpha_3 \ldots + c_{11}\alpha_1^2 + c_{12}\alpha_2^2 + c_{13}\alpha_3^2]q$$

$L_1$ represents the lift at the region 24. A signal proportional to $L_1$ appears at the output of the load cell 36. However, $k_{11}\alpha_1$ is obtained by connecting an adjustable potentiometer 62 in series circuit relationship with the output of the accelerometer 56. The quantity $k_{12}\alpha_2$ is obtained by connecting an adjustable potentiometer 64 in series circuit relationship with the output of the accelerometer 58 while the quantity $k_{13}\alpha_3$ is obtained by connecting an adjustable potentiometer 66 in series circuit relationship with the output of the accelerometer 60.

Looking at the latter part of the equation for $L_1$ the quantity $\alpha_1^2$ is obtained by connecting a squaring circuit 68 in series circuit relationship with the output of the accelerometer 56, to thus square $\alpha_1$. A potentiometer 70 is connected in series circuit relationship with the squaring circuit 68 in order to obtain the quantity $c_{11}$. In like manner, $\alpha_2$ is squared by connecting a squaring circuit 72 in series circuit relationship with the output of the accelerometer 58, the quantity $c_{12}$ being obtained by connecting an adjustable potentiometer 74 in series circuit relationship with the squaring circuit 72. Similarly, a squaring circuit 76 is connected in series circuit relationship with the output of the accelerometer 60 in order to obtain the square of $\alpha_3$, the quantity $c_{13}$ being obtained by connecting an adjustable potentiometer 78 in series circuit relationship with the squaring circuit 76.

As illustrated in FIG. 1, the hereinbefore mentioned series circuits are connected to the input of a summer 80 in order to sum the quantities, $k_{11}\alpha_1$, $k_{12}\alpha_2$, $k_{13}\alpha_3$, $c_{11}\alpha_1^2$, $c_{12}\alpha_2^2$ and $c_{13}\alpha_3^2$. For the purpose of multiplying this summation by the quantity $q$ a Q amplifier 82 is connected to be responsive to the output signal from the summer 80.

A summer or comparator device 84 is connected to be responsive to the output signal from the Q amplifier 82. In operation, the summer 84 compares the output signal from the Q amplifier 82 with the output signal from the load cell 36, the output from the load cell 36 being electrically connected to the input of the summer 84. Thus, if the value of $L_1$, as represented at the output of the load cell 36, is not of proper value as called for by the output from the Q amplifier 82, an error signal will appear at the output of the summer 84. This error signal is applied through a servo amplifier 85 to a loading means, specifically a servomotor 86 and a cable 87 which is disposed to be actuated by the servomotor 86 to vary the angular position of the rib 12. The load cell 36 is associated with the cable 87 to obtain an output signal proportional to the lift on the region 24. As long as an error signal is being applied to the servomotor 86 the servomotor effects a change in the lift at the region 24 until finally a balance condition is reached in which the output signal from the Q amplifier 82, as applied to the input of the summer 84, is equal to the output signal from the load cell 36.

In case the value of the weight 18 is not correct for the particular conditions a weight correction factor can be applied by applying a signal to the input of a summer 90. Specifically, a correcting signal is applied to a terminal 92 which is electrically connected to the input of the summer 90. In other words, the correcting signal applied to the terminal 92 either adds or subtracts from the output signal from the Q amplifier 82, as applied to the input of the summer 90, to thus either increase or decrease the effective weight of the region 24.

Referring to the equation $$L_2 = [k_{21}\alpha_1 + k_{22}\alpha_2 + k_{23}\alpha_3 \ldots + c_{21}\alpha_1^2 + c_{22}\alpha_2^2 + c_{23}\alpha_3^2]q$$

the quantity $L_2$ represents the lift applied at the region 26. A signal proportional to the quantity $L_2$ appears at the output of the load cell 38. Referring to this latter equation the quantity $k_{21}\alpha_1$ is obtained by connecting an adjustable potentiometer 94 in series circuit relationship with the output of the accelerometer 56, the quantity $k_{22}\alpha_2$ being obtained by connecting an adjustable potentiometer 96 in series circuit relationship with the output of the accelerometer 58. On the other hand, the quantity $k_{23}\alpha_3$ is obtained by connecting an adjustable potentiometer 98 in series circuit relationship with the output of the accelerometer 60.

Squaring of the quantity $\alpha_1$ and then multiplying it by $c_{21}$ is obtained by connecting a squaring circuit 100 in series circuit relationship with an adjustable potentiometer 102 and then connecting the latter series circuit in series circuit relationship with the output of the accelerometer 56. In like manner, a squaring circuit 104 is connected in series circuit relationship with an adjustable potentiometer 106 in order to square the quantity $\alpha_2$ and then multiply it by $c_{22}$. Similarly, the quantity $\alpha_3$ is obtained by a squaring circuit 108 and the quantity $c_{23}$ by an adjustable potentiometer 110, the squaring circuit 108 and the adjustable potentiometer 110 being connected in series circuit relationship with the output of the accelerometer 60.

The summation of the quantities $k_{21}\alpha_1$, $k_{22}\alpha_2$, $k_{23}\alpha_3$, $c_{21}\alpha_1^2$, $c_{22}\alpha_2^2$ and $c_{23}\alpha_3^2$ is obtained by connecting the series circuits, including the adjustable potentiometers 94, 96, 98, 102, 106 and 110 and the squaring circuits 100, 104 and 108, to the input of a summer 112.

In order to multiply the summation obtained by the summer 112 by the quantity $q$ a Q amplifier 114 is connected to be responsive to the output signal from the summer 112. A comparison between a signal proportional to the output signal from the Q amplifier 114 and the output signal from the load cell 38 is made by a summer or comparison device 116, the output error signal from which is applied to the input of a servomotor 118 through a servo amplifier 120. A cable 121 is disposed to be actuated by the servomotor 118 to vary the angular position of the rib 14, the load cell 38 being associated with the cable 121 to obtain an output signal proportional to the lift $L_2$ on the region 26. Here again, if the output signal from the load cell 38 is not of a proper value, as is called for by the Q amplifier 114, the servomotor 118 effects a change in the magnitude of the lift at the region 26 until a balance condition is reached.

A weight correction for the weight 20 can be obtained by applying a weight correction signal to a terminal 122 which is electrically connected to the input of a summer 124 which in turn is interconnected between the Q amplifier 114 and the summer 116. The signal applied to the terminal 122 either adds or subtracts from the output signal from the Q amplifier 114, to thus either increase or decrease the effective weight of the region 26.

Referring to the equation $$L_3 = [k_{31}\alpha_1 + k_{32}\alpha_2 + k_{33}\alpha_3 \ldots + c_{31}\alpha_1^2 + c_{32}\alpha_2^2 + c_{33}\alpha_3^2]q$$

the quantity $L_3$ represents the lift applied at the region 28. A signal proportional to the quantity $L_3$ appears at the output of the load cell 40.

In order to obtain the quantity $k_{31}\alpha_1$ an adjustable potentiometer 126 is connected in series circuit relationship with the output of the accelerometer 56. In like manner, the quantity $k_{32}\alpha_2$ is obtained by connecting an adjustable potentiometer 128 in series circuit relationship with the output of the accelerometer 58. Similarly, in order to obtain the quantity $k_{33}\alpha_3$ an adjustable potentiometer 130 is connected in series circuit relationship with the output of the accelerometer 60. On the other hand, the quantity $c_{31}\alpha_1^2$ is obtained by a squaring circuit 132, which squares the quantity $\alpha_1$, and an adjustable potentiometer 134 which effects the quantity $c_{31}$. As illustrated, the squaring circuit 132 and the adjustable potentiometer 134 are connected in series circuit relationship with respect to the output of the accelerometer 56. A squaring circuit 136 is provided for squaring $\alpha_2$ and an adjustable potentiometer 138 is provided for obtaining the quantity $c_{32}$. As shown, the squaring circuit 136 and the adjustable potentiometer 138 are connected in series circuit relationship with the output of the accelerometer 58. The squaring of the quantity $\alpha_3$ is obtained by a squaring circuit 140 which has connected in series circuit relationship therewith an adjustable potentiometer 142 which provides the quantity $c_{33}$. The latter series circuit is connected to be responsive to the output signal from the accelerometer 60.

As illustrated each of the adjustable potentiometers 126, 128, 130, 134, 138 and 142 are connected to the input of a summer 144, to thus obtain an output signal from the summer 144 which is proportional to the sum of $k_{31}\alpha_1$, $k_{32}\alpha_2$, $k_{33}\alpha_3$, $c_{31}\alpha_1^2$, $c_{32}\alpha_2^2$ and $c_{33}\alpha_3^2$.

For the purpose of multiplying the output signal from the summer 144 by the quantity $q$ a Q amplifier 146 is connected to be responsive to the output signal from the summer 144. A comparison is made between a signal proportional to the output signal from the Q amplifier 146 and a signal proportional to the output signal of the load cell 40 by a summer or comparison device 148. If the signal applied to the input of the summer 148, as received from the output of the Q amplifier 146, is of different magnitude than the input signal to the summer 148, as received from the output of the load cell 40, and error signal appears at the output of the summer 148 and is applied to the input of a servomotor 150 through a servo amplifier 152. A cable 153 is disposed to be actuated by the servomotor 150 to vary the angular position of the rib 16, the load cell 40 being associated with the cable 153 to obtain an output signal proportional to the lift $L_3$ on the region 28. In operation, the servomotor 150 continues to effect a change in the lift at the region 28 as long as an error signal appears at the output of the summer 148.

A weight correction for the weight 22 is effected by applying a weight correction signal to a terminal 154 which is electrically connected to the input of a summer 156 which is also responsive to the output signal from the Q amplifier 146. In operation the correction signal applied to the terminal 154 either increases or decreases the output signal from the summer 156 to thus either increase or decrease the effective weight of the region 28.

In flight an airplane is also subject to drag which can be written as a power series as follows:

$$D_1=[d_{11}\alpha_1^2+d_{12}\alpha_2^2+d_{13}\alpha_3^2]q+D_{O1}q$$
$$D_2=[d_{21}\alpha_1^2+d_{22}\alpha_2^2+d_{23}\alpha_3^2]q+D_{O2}q$$
$$D_3=[d_{31}\alpha_1^2+d_{32}\alpha_2^2+d_{33}\alpha_3^2]q+D_{O3}q$$

In the foregoing equations D represents the drag on a particular region in pounds, $D_1$ representing the drag at the region 24, $D_2$ the drag at the region 26, and $D_3$ the drag at the region 28. On the other hand, $\alpha_i$ represents the angle of attack at $i$ in radians, $q$ the dynamic pressure in pounds per square feet, $d_{ij}$ the induced drag influence coefficient which gives the drag at $i$ due to unit angle deflection at $j$, and $D_{oi}$ the given friction drag at $i$.

In the foregoing equations $q$, the dynamic pressure in pounds per square feet, can be mathematically computed for a given operating condition. The quantities $d_{ij}$ and $D_{oi}$ can also be theoretically determined. However, D, the drag at a particular region, is an unknown and the apparatus of this invention solves for this unknown.

Applying the above drag equations to the apparatus shown in FIG. 1 the quantity $\alpha_1^2$ is obtained by connecting a squaring circuit 154 to be responsive to the output signal of the accelerometer 56. Connected in series circuit relationship with the squaring circuit 154 is an adjustable potentiometer 156 which is provided for obtaining the quantity $d_{11}$. In like manner, the quantity $\alpha_2^2$ is obtained by connecting a squaring circuit 158 to be responsive to the output signal of the accelerometer 58. Connected in series circuit relationship with the squaring circuit 158 is an adjustable potentiometer 160 which is provided for obtaining the quantity $d_{12}$. Similarly, a squaring circuit 162 is connected to be responsive to the output signal of the accelerometer 60 in order to obtain the quantity $\alpha_3^2$. An adjustable potentiometer 164 is connected in series circuit relationship with the squaring circuit 162 in order to obtain the quantity $d_{13}$. As illustrated, each of the adjustable potentiometers 156, 160 and 164 are connected to the input of a summer 166 in order to obtain the summation of the quantities $d_{11}\alpha_1^2$, $d_{12}\alpha_2^2$ and $d_{13}\alpha_3^2$.

The friction or wave drag $D_{O1}$ for the region 24 is obtained by applying a signal to a terminal 168, which terminal 168 is electrically connected to the input of a summer 170. Thus, in operation the $D_{O1}$ signal applied to the terminal 168 is added, in the summer 170, to the output signal from the summer 166 and the combined output signal from the summer 170 is multiplied by a Q amplifier 172.

A servomotor 174 is connected to the rib 12 through a cable 176 to effect a drag on the region 24. Interposed in the cable 176 is a load cell 178 whose output signal is proportional to the drag load $D_1$ on the region 24. A comparison is made between the output signal from the load cell 178 and the output signal from the Q amplifier 172 by a summer or comparator device 180, to thus produce an output error signal from the summer 180 which is proportional to the difference between the output from the load cell 178 and the output from the Q amplifier 172. In order to control the operation of the servomotor 174 in accordance with the output error signal from the summer 180, the output of the summer 180 is electrically connected to the servomotor 174 through a servo amplifier 182.

Referring to the equation $$D_2=[d_{21}\alpha_1^2+d_{22}\alpha_2^2+d_{23}\alpha_3^2]q+D_{O2}q$$

the value of $D_2$ is obtained from the output of a load cell 184 which is interposed in a cable 186 which in turn is interconected between the rib 14 and a servomotor 188. On the other hand, the quantity $\alpha_1^2$ is obtained by means of a squaring circuit 190 which is connected to be responsive to the output signal from the accelerometer 56. Connected in series circuit relationship with the squaring circuit 190 is an adjustable potentiometer 192 which functions to obtain the quantity $d_{21}$. In like manner, the quantity $\alpha_2^2$ is obtained by connecting a squaring circuit 194 to be responsive to the output signal from the accelerometer 58. An adjustable potentiometer 196 is connected in series circuit relationship with the squaring circuit 194 in order to obtain the quantity $d_{22}$. Similarly, a squaring circuit 198 is connected to be responsive to the output signal from accelerometer 60 in order to obtain the quantity $\alpha_3^2$. Connected in series circuit relationship with the squaring circuit 198 is an adjustable potentiometer 200 which functions to effect the quantity $d_{33}$.

As shown, the adjustable potentiometers 192, 196 and 200 are connected to the input of a summer 202 in order to obtain the summation of the quantities $d_{21}\alpha_1^2$, $d_{22}\alpha_2^2$ and $d_{23}\alpha_3^2$. A signal proportional to $D_{O2}$, the friction or wave drag at the region 26, is applied to a terminal 204 which is electrically connected to the input of a summer 206. The input of the summer 206 is also responsive to the output signal from the summer 202. Thus, the output from the summer 206 is proportional to the sum of $d_{21}\alpha_1^2$, $d_{22}\alpha_2^2$, $d_{23}\alpha_3^2$ and $D_{O2}$. The output signal from the summer 206 is then multiplied by a Q amplifier 208 to thus satisfy the above referred to equation.

For the purpose of comparing the output signal from the load cell 184 with the output signal from the Q amplifier 208, a summer 210 is connected to be responsive to the output signal from the Q amplifier 208 and to the output signal from the load cell 184. As illustrated, the output of the summer 210 is electrically connected to the servomotor 188 through a servo amplifier 212 to effect a rotation of the servomotor 188 as long as an error signal appears at the output of the summer 210.

Referring to the equation $$D_3 = [d_{31}\alpha_1^2 + d_{32}\alpha_2^2 + d_{33}\alpha_3^2]q + D_{O3}q$$

the quantity $D_3$ represents the drag load appearing at the region 28. A measure of this drag $D_3$ appears at the output of a load cell 214 which is interposed in a cable 216 which is interconnected between the rib 16 and a servomotor 218. In practice, the load cells 178, 184 and 214 can be, for instance, Wheatstone bridge resistive strain gages. Center-scale galvanometers 178', 184' and 214' are suitably connected to the load cells 178, 184 and 214, respectively, in order to obtain an indication of the values of $D_1$, $D_2$, and $D_3$, respectively. However, it is to be understood that if recording of the values of $D_1$, $D_2$ and $D_3$ is desired recording means (not shown) could be connected to the load cells 178, 184 and 214 instead of the indicating means 178', 184' and 214'. Further, depending upon the circumstances, the load cells 178, 184 and 214 could be of a type other than the Wheatstone bridge resistive strain gage type. However, for instance, the combination of the load cell 178 and the indicating means 178' or the combination of the load cell 178 and the recording means (not shown) is referred to as measuring means. The quantity $\alpha_1^2$ in the above mentioned equation is obtained by connecting a squaring circuit 220 to be responsive to the output signal from the accelerometer 56. On the other hand, the quantity $d_{31}$ is obtained by connecting an adjustable potentiometer 222 in series circuit relationship with the squaring circuit 220.

In order to obtain the quantity $\alpha_2^2$ a squaring circuit 224 is connected to be responsive to the output signal from the accelerometer 58. Connected in series circuit relationship with the squaring circuit 224 is an adjustable potentiometer 226 which functions to effect the quantity $d_{32}$. On the other hand, a squaring circuit 228 is connected to be responsive to the output signal from the accelerometer 60 in order to provide the quantity $\alpha_3^2$. An adjustable potentiometer 230 is connected in series circuit relationship with the squaring circuit 228 so as to provide the quantity $d_{33}$.

As illustrated, the adjustable potentiometers 222, 226 and 230 are connected to the input of a summer 232 to effect at the output of the summer 232 a signal which is proportional to the sum of $d_{31}\alpha_1^2$, $d_{32}\alpha_2^2$ and $d_{33}\alpha_3^2$. A signal proportional to $D_{O3}$ is applied to a terminal 234, the terminal 234 being electrically connected to the input of a summer 236. As shown, the output of the summer 232 is also connected to the input of the summer 236 and thus in operation a signal appears at the output of the summer 236 which is proportional to the sum of $d_{31}\alpha_1^2$, $d_{33}\alpha_2^2$, $d_{33}\alpha_3^2$ and $D_{O3}$.

In order to multiply the output signal of the summer 236 by the quantity $q$ a Q amplifier 238 is connected to be responsive to the output signal from the summer 236. The output signal from the load cell 214 is compared with output signal of the Q amplifier 238 in a summer or comparison device 240, to thus produce an output error signal from the summer 240. In operation, the output error signal from the summer 240 is applied to the servomotor 218 by means of a servo amplifier 242 which is interconnected between servomotor 218 and the output of the summer 240.

In order to consider rolling maneuvers for the airplane it is necessary to add in a $\delta\alpha$ to each of the regions 24, 26 and 28 because rolling alters direction at which the wind hits the wing. Specifically, a signal proportional to the particular rolling velocity is applied to terminals 244, 246 and 248 which are electrically connected to summers 250, 252 and 254, respectively, through adjustable potentiometers 256, 258 and 260, respectively, which function to bias the angle of attack of the respective regions 24, 26 and 28 by an angle equal to the product of the distance outboard of the wing centerline and the ratio of the rolling velocity to the forward velocity. This causes a change in the loading pattern, the change being proportional to $\delta\alpha$ due to roll. A strain gage 261 which is mounted on a top fiber of the spar 10 indicates this change by measuring wing bending moment strain. Enough aileron deflection must be added to terminals 262, 264 and 266 to reduce this change in the strain gage 261 to zero. This amount of aileron is then the amount required to achieve the rolling velocity responsible for $\delta\alpha$ due to roll.

The effect of varying the position of a control surface at each of the regions 24, 26 and 28 can be obtained by adding another $\delta\alpha$ to each of the regions 24, 26 and 28. In particular, this is accomplished by applying a control surface signal to terminals 262, 264 and 266 which are electrically connected to summers 268, 270 and 272, respectively. These control signals simulate flap movement.

The operation of the apparatus and circuits shown in FIG. 1 will now be described. Once the various adjustable potentiometers have been adjusted to provide the computed values of linear and nonlinear aerodynamic influence coefficients and induced drag influence coefficients, and the proper values of signal input to the terminals 168, 204 and 234 have been applied for the purpose of accounting for the friction and wave drag at the regions 24, 26 and 28, respectively, and once signals have been applied to the terminals 48 and 50 to take into account the effect of the tail load, then the command signal is applied to the terminal 30 to thus effect a rotation of the spar 10, thereby changing the angle of attack of the structure 8. A change in the angle of attack of the structure 8 changes the output signals from the accelerometers 56, 58 and 60, to thus change the magnitude of the input signals to the respective summers 84, 116 and 148. This latter action increases the magnitude of the output signals from the respective summers 84, 116 and 148, to thereby effect a rotation of the respective servomotors 86, 118 and 150, to thereby increase the upward lift at the respective regions 24, 26 and 28. An increase in the upward lift at the respective regions 24, 26 and 28 increases the magnitude of the output signal from the respective load cells 36, 38 and 40 until finally a balance condition is reached in which the output error signals from the summers 84, 116 and 148 are of zero magnitude. When this balance or equilibrium state is reached the servomotors 86, 118 and 150 stop rotating.

While the servomotors 86, 118 and 150 are effecting an upward lift on the structure 8 the servomotors 174, 188 and 218 are simultaneously producing a drag effect on the structure 8. Specifically, with an increase in the angle of attack of the structure 8 the output signals from the accelerometers 56, 58 and 60 increase to thereby increase the magnitude of the output signals from the respective Q amplifiers 172, 208 and 238. This latter action increases the magnitude of the output signals from the respective summers 180, 210 and 240, to thus effect a rotation of the servomotors 174, 188 and 218, to thereby increase the magnitude of the output signals from the respective load cells 178, 184 and 214. The servomotors 174, 188 and 218 continue to rotate until their error input signals are of zero magnitude.

With no further rotation of the servomotors 174, 188 and 218 and with no further rotation of the servomotors 86, 118 and 150 an equilibrium state is reached and now the values of angle of attack at the regions 24, 26 and 28 are indicated on the galvanometers 56', 58' and 60', respectively. In addition, the magnitudes of the lift forces at the regions 24, 26 and 28 are indicated at the respective galvanometers 36', 38' and 40'. Further, the magnitude of the various drag forces at the regions 24, 26 and 28 are indicated at the respective galvanometers 178', 184' and 214'. Also, by placing strain gages 280 and 282 between the regions 24, 26 and 28 the stresses at these points can be determined and read at galvanometers 284 and 286, respectively.

Referring to FIG. 2 this invention is illustrated with respect to a structure 300 having a low aspect ratio. Specifically, the structure 300 is an airplane configuration having a low aspect ratio.

The structure 300 is divided into five lift regions 302, 304, 306, 308 and 310. The regions 308 and 310 are control regions which in this instance are elevons which perform the roll and pitch trim functions. However, it is to be understood that on other vehicles than the one shown in FIG. 2 the control regions (not shown) corresponding to the control regions 308 and 310 could perform the functions of ailerons, elevators, reading controls or other means to effect trim of the vehicle. Cables 312, 314, 316, 318 and 320 are attached to the respective regions 302, 304, 306, 308 and 310 to effect an upward lift on the respective regions. The cables 312, 314, 316, 318, and 320 are disposed to be pulled upwardly by servomotors 322, 324, 326, 328 and 330, respectively. In order to obtain output signals which are proportional to these upward forces applied to the respective regions 302, 304, 306, 308 and 310, load cells 332, 334, 336, 338 and 340 are interposed in the respective cables 312, 314, 316, 318 and 320. In practice, the load cells 332, 334, 336, 338 and 340 can be, for instance, Wheatstone bridge resistive strain gages. Center-scale galvanometers 332', 334', 336', 338' and 340' are suitably connected to the load cells 332, 334, 336, 338 and 340, respectively, in order to obtain an indication of the upward force, applied to the respective regions 302, 304, 306, 308 and 310. However, it is to be understood that if recording of the values is desired recording means (not shown) could be suitably connected to the respective load cells 332, 334, 336, 338 and 340 instead of the indicating means 332', 334', 336', 338' and 340'. Further, depending upon the circumstances, the load cells 332, 334, 336, 338, 340, could be of a type other than the Wheatstone bridge resistive strain gage type. However, for instance, the combination of the load cell 332 and the associated indicating means 332', or the combination of the load cell 332 and the associated recording means (not shown) is referred to as measuring means.

Three substantially vertical bars 342, 344, and 346 are disposed below the structure 300, the upper end of the bars 342, 344 and 346 being connected to the regions 348, 350 and 352, respectively. The lower end of the bars 342, 344 and 346 are fixed so as to enable them to apply a force to their respective regions 348, 350 and 352. As illustrated, the bar 342 is so disposed in one direction from the bars 344 and 346 and the bars 344 and 346 are so disposed in another direction from one another as to permit the cables 312, 314, 316, 318 and 320 to effect a deformation of the structure 300.

In order to obtain output signals proportional to the deformation of the structure 300 at the regions 302, 304, 306, 308 and 310, accelerometers 354, 356, 358, 360 and 362 are disposed at the respective regions 302, 304, 306, 308 and 310. In practice, the accelerometers 354, 356, 358, 360 and 362 can be, for instance, Wheatstone bridge resistive strain gages. Center-scale galvanometers 354', 356', 358', 360' and 362', are suitably connected to the accelerometers 354, 356, 358, 360 and 362, respectively, in order to obtain an indication of the deformation of the structure 300 at the regions 302, 304, 306, 308 and 310, respectively. However, it is to be understood that if recording of the values is desired recording means (not shown) could be connected to the respective accelerometers 354, 356, 358, 360 and 362 instead of the indicating means 354', 356', 358', 360' and 362'. Further, depending upon the circumstances, the accelerometers 354, 356, 358, 360 and 362 could be of another type than the Wheatstone bridge resistive strain gage type. However, for instance, the combination of the accelerometer 354 and the indicating means 354', or the combination of the accelerometer 354 and the associated recording means (not shown) is referred to as measuring means.

Weights 364, 366, 368, 370 and 372 are hung from the respective regions 302, 304, 306, 308 and 310 for the purpose of providing the proper weight for the respective regions. In operation, the lift effected by servomotors 322, 324, 326, 328 and 330 places the bars 342, 344 and 346 in tension and thus these bars, as do the weights 364, 366, 368, 370 and 372, effect a downward pull on the structure 300. Thus, in order to obtain a flight condition of the structure 300 the sum of the weight of the structure 300 plus the downard forces exerted by the weights 364, 366, 368, 370 and 372 and the downward forces exerted by the bars 342, 344 and 346 should equal the sum of the upward forces exerted by the cables 312, 314, 316, 318 and 320. In order to obtain output signals which are proportional to the downward force exerted on the structure 300 by the bars 342, 344 and 346, load cells 374, 376 and 378 are interposed in the respective bars 342, 344 and 346.

The lift on the respective regions 302, 304, 306, 308 and 310 can be expressed in a power series as follows:

$$L_1 = [k_{11}\alpha_1 + k_{12}\alpha_2 + k_{13}\alpha_3 + k_{14}\alpha_4 + k_{15}\alpha_5 \\ + c_{11}\alpha_1^2 + c_{12}\alpha_2^2 + c_{13}\alpha_3^2 + c_{14}\alpha_4^2 + c_{15}\alpha_5^2]q$$

$$L_2 = [k_{21}\alpha_1 + k_{22}\alpha_2 + k_{23}\alpha_3 + k_{24}\alpha_4 + k_{25}\alpha_5 \\ + c_{21}\alpha_1^2 + c_{22}\alpha_2^2 + c_{23}\alpha_3^2 + c_{24}\alpha_4^2 + c_{25}\alpha_5^2]q$$

$$L_3 = [k_{31}\alpha_1 + k_{32}\alpha_2 + k_{33}\alpha_3 + k_{34}\alpha_4 + k_{32}\alpha_5 \\ + c_{31}\alpha_1^2 + c_{32}\alpha_2^2 + c_{33}\alpha_3^2 + c_{34}\alpha_4^2 + c_{35}\alpha_5^2]q$$

$$L_4 = [k_{41}\alpha_1 + k_{42}\alpha_2 + k_{43}\alpha_3 + k_{44}\alpha_4 + k_{45}\alpha_5 \\ + c_{41}\alpha_1^2 + c_{42}\alpha_2^2 + c_{43}\alpha_3^2 + c_{44}\alpha_4^2 + c_{45}\alpha_5^2]q$$

$$L_5 = [k_{51}\alpha_1 + k_{52}\alpha_2 + k_{53}\alpha_3 + k_{54}\alpha_4 + k_{55}\alpha_5 \\ + c_{51}\alpha_1^2 + c_{52}\alpha_2^2 + c_{53}\alpha_3^2 + c_{54}\alpha_4^2 + c_{55}\alpha_5^2]q$$

In the above equations $L_1$, $L_2$, $L_3$, $L_4$ and $L_5$ represent the lifts on the respective regions 302, 304, 306, 308 and 310. On the other hand, $\alpha_i$ is the angle of attack at $i$ in radians, $q$ the dynamic pressure in pounds per square feet, $k_{ij}$ the linear aerodynamic influence coefficient which gives the lift at $i$ due to the unit angle deflection at $j$, $c_{ij}$ the non-linear aerodynamic influence coefficient which gives the lift at $i$ due to the square of the angle of deflection at $j$. In these equations $q$ is a computed quantity for a given operating condtion and $k_{ij}$ and $c_{ij}$ are also theoretically determined quantities. The apparatus shown in FIG. 2 solves for L the lift per station in pounds, and for $\alpha_i$, the angle of attack at $i$ in radians.

Referring to the above equation for the lift at the region 302 in which $$L_1 = [k_{11}\alpha_1 + k_{12}\alpha_2 + k_{13}\alpha_3 + k_{14}\alpha_4 + k_{15}\alpha_5 \\ + c_{11}\alpha_1^2 + c_{12}\alpha_2^2 + c_{13}\alpha_3^2 + c_{14}\alpha_4^2 + c_{15}\alpha_5^2]q,$$

the quantity $k_{11}\alpha_1$ is obtained by rendering an adjustable potentiometer 380 responsive to the output signal from the accelerometer 354. On the other hand, the quantities $k_{12}\alpha_2$, $k_{13}\alpha_3$, $k_{14}\alpha_4$ and $k_{15}\alpha_5$ are obtained by rendering adjustable potentiometers 382, 384, 386 and 388 responsive to the output signal from their respective accelerometers 356, 358, 360 and 362.

The quantities $\alpha_1^2$, $\alpha_2^2$, $\alpha_3^2$, $\alpha_4^2$ and $\alpha_5^2$ are obtained by rendering squaring circuits 390, 392, 394, 396 and 398 responsive to the output signals from their respective accelerometers 354, 356, 358, 360 and 362. By connecting an adjustable potentiometer 400 in series circuit relationship with the squaring circuit 390 the quantity $c_{11}$ is obtained. In like manner, the quantities $c_{12}$, $c_{13}$, $c_{14}$ and $c_{15}$ are obtained by connecting adjustable potentiometers 402, 404, 406 and 408 in series circuit relationship with their respective squaring circuits 392, 394, 396 and 398.

For the purpose of summing the quantities $k_{11}\alpha_1$, $k_{12}\alpha_2$, $k_{13}\alpha_3$, $k_{14}\alpha_4$, $k_{15}\alpha_5$, $c_{11}\alpha_1^2$, $c_{12}\alpha_2^2$, $c_{13}\alpha_3^2$, $c_{14}\alpha_4^2$ and $c_{15}\alpha_5^2$ the adjustable potentiometers 380, 382, 384, 386, 400, 402, 404, 406 and 408 are connected to the input of a control summer 410. A Q amplifier 412 is connected to be responsive to the output signal from the control summer 410 in order to multiply the output from the control summer 410 by the quantity $q$.

A signal proportional to the output of the Q amplifier 412 is applied to the input of a summer 414 and this input signal is compared with the output signal from the load cell 332 to thus obtain an error signal at the output of the summer 414. In operation, the error signal, appearing at the output of the summer 414, after being amplified by a servo amplifier 416, effects a rotation of the servomotor 322, to thus effect a lift at the region 302.

Referring to the equation for $L_2$, the lift at the region 304, the quantity $k_{21}\alpha_1$ is obtained by connecting an adjustable potentiometer 418 to be responsive to the output signal from the accelerometer 354. In like manner, the quantities $k_{22}\alpha_2$, $k_{23}\alpha_3$, $k_{24}\alpha_4$, $k_{25}\alpha_5$ are obtained by rendering adjustable potentiometers 420, 422, 424 and 426 responsive to the output signals from their respective accelerometers 356, 358, 360 and 362. On the other hand, the quantities $\alpha_1^2$, $\alpha_2^2$, $\alpha_3^2$, $\alpha_4^2$, and $\alpha_5^2$ are obtained by connecting squaring circuits 428, 430, 432, 434 and 436 to be responsive to output signals from their respective accelerometers 354, 356, 358, 360 and 362. The quantities $c_{21}$, $c_{22}$, $c_{23}$, $c_{24}$ and $c_{25}$ are obtained by connecting adjustable potentiometers 438, 440, 442, 444 and 446 in series circuit relationship with the respective squaring circuits 428, 430, 432, 434 and 436.

The summation of the quantities $k_{21}\alpha_1$, $k_{22}\alpha_2$, $k_{23}\alpha_3$, $k_{24}\alpha_4$, $k_{25}\alpha_5$, $c_{21}\alpha_1^2$, $c_{22}\alpha_2^2$, $c_{23}\alpha_3^2$, $c_{24}\alpha_4^2$ and $c_{25}\alpha_5^2$ is obtained by connecting the adjustable potentiometers 418, 420, 422, 424, 426, 438, 440, 442, 444 and 446 to the input of a control summer 448. This latter summation is then multiplied by the quantity $q$ by rendering a Q amplifier 450 responsive to the output signal from the control summer 448.

The output signal from the load cell 334 is compared with a signal proportional to the output signal of the Q amplifier 450 in a summer 452, to thus effect at the output of the summer 452 an error signal proportional to the difference between the two input signals to the summer 452. The error signal, appearing at the output of the summer 452, is amplified by a servo amplifier 454 and is applied to the servomotor 324, to thus effect an upward force on the region 304 in accordance with the error signal.

Referring to the equation for the lift at the region 306, $$L_3=[k_{31}\alpha_1+k_{32}\alpha_2+k_{33}\alpha_3+k_{34}\alpha_4+k_{35}\alpha_5 \ldots +c_{31}\alpha_1^2 +c_{32}\alpha_2^2+c_{33}\alpha_3^2+c_{34}\alpha_4^2+c_{35}\alpha_5^2]q$$

the quantities $k_{31}\alpha_1$, $k_{32}\alpha_2$, $k_{33}\alpha_3$, $k_{34}\alpha_4$ and $k_{35}\alpha_5$ are obtained by rendering adjustable potentiometers 456, 458, 460, 462 and 464 responsive to the output signals from their respective accelerometers 354, 356, 358, 360 and 362. The quantities $\alpha_1^2$, $\alpha_2^2$, $\alpha_3^2$, $\alpha_4^2$ and $\alpha_5^2$ are obtained by connecting squaring circuits 466, 468, 470, 472 and 474 to be responsive to the output signals from the accelerometers 354, 356, 358, 360 and 362, respectively. By connecting adjustable potentiometers 476, 478, 480, 482 and 484 in series circuit relationship with the squaring circuits 466, 468, 470, 472 and 474, respectively, the quantities $c_{31}$, $c_{32}$, $c_{33}$, $c_{34}$ and $c_{35}$, respectively, are obtained.

The summation of the quantities $k_{31}\alpha_1$, $k_{32}\alpha_2$, $k_{33}\alpha_3$, $k_{34}\alpha_4$, $k_{35}\alpha_5$, $c_{31}\alpha_1^2$, $c_{32}\alpha_2^2$, $c_{33}\alpha_3^2$, $c_{34}\alpha_4^2$ and $c_{35}\alpha_5^2$ is obtained by connecting the adjustable potentiometers 476, 478, 480, 482, 484, 456, 458, 460, 462 and 464 to the input of a control summer 486, the output signal from the control summer 86 being proportional to this latter summation. A Q amplifier 488 is connected to be responsive to the output signal from the control summer 486, to thus effect the multiplication of the last mentioned summation by the quantity $q$.

The output signal from the load cell 336 is compared with a signal proportional to the output signal from the Q amplifier 488 in a summer 490 to thus effect an error signal proportional to the difference in these compared signals. After being amplifier in a servo amplifier 492 this latter error signal is applied to the servomotor 326, to thus effect an upward forme on the region 306.

Referring to the equation for the lift on the region 308, $$L_4=[k_{41}\alpha_1+k_{42}\alpha_2+k_{43}\alpha_3+k_{44}\alpha_4+k_{45}\alpha_5 \ldots +c_{41}\alpha_1^2 +c_{42}\alpha_2^2+c_{43}\alpha_3^2+c_{44}\alpha_4^2+c_{45}\alpha_5^2]q$$

the quantities $k_{41}\alpha_1$, $k_{42}\alpha_2$, $k_{43}\alpha_3$, $k_{44}\alpha_4$, and $k_{45}\alpha_5$ are obtained by connecting adjustable potentiometers 494, 496, 498, 500 and 502 to be responsive to the output signals from the accelerometers 354, 356, 358, 360 and 362, respectively. On the other hand, the quantities $\alpha_1^2$, $\alpha_2^2$, $\alpha_3^2$, $\alpha_4^2$ and $\alpha_5^2$ are obtained by connecting squaring circuits 504, 506, 508, 510 and 512 to be responsive to the output signals from the accelerometers 354, 356, 358, 360 and 362, respectively. By connecting adjustable potentiometers 513, 514, 516, 518 and 520 in series circuit relationship with the squaring circuits 504, 506, 508, 510 and 512, respectively, the quantities $c_{41}$, $c_{42}$, $c_{43}$, $c_{44}$ and $c_{45}$, respectively, are obtained.

For the purpose of obtaining the summation of the quantities $k_{41}\alpha_1$, $k_{42}\alpha_2$, $k_{43}\alpha_3$, $k_{44}\alpha_4$, $k_{45}\alpha_5$, $c_{41}\alpha_1^2$, $c_{42}\alpha_2^2$, $c_{43}\alpha_3^2$, $c_{44}\alpha_4^2$ and $c_{45}\alpha_5^2$ the adjustable potentiometers 494, 496, 498, 500, 502, 513, 514, 516, 518, and 520 are connected to the input of a control summer 522 to thus produce at the output of the control summer 522 a signal proportional to this latter summation. A Q amplifier 524 is connected to be responsive to the output signal from the control summer 522, to thus effect a multiplication of the latter mentioned summation by the quantity $q$.

In order to compare the output signal from the load cell 338 with a signal proportional to the signal output from the Q amplifier 524, to thus obtain an error signal proportional to the difference in the two input signals, a summer 526 is provided. The error signal appearing at the output of the summer 526 is amplified by a servo amplifier 528 and is applied to the servomotor 328, to thus effect an upward lift on the region 308.

Referring to the equation for the lift on the region 310, $$L_5=[k_{51}\alpha_1+k_{52}\alpha_2+k_{53}\alpha_3+k_{54}\alpha_4+k_{55}\alpha_5 \ldots +c_{51}\alpha_1^2 +c_{52}\alpha_2^2+c_{53}\alpha_3^2+c_{54}\alpha_4^2+c_{55}\alpha_5^2]q$$

the quantities $k_{51}\alpha_1$, $k_{52}\alpha_2$, $k_{53}\alpha_3$, $k_{54}\alpha_4$ and $k_{55}\alpha_5$ are obtained by connecting adjustable potentiometers 530, 532, 534, 536 and 538 to be responsive to the output signals from the accelerometers 354, 356, 358, 360 and 362, respectively. The quantities $\alpha_1^2$, $\alpha_2^2$, $\alpha_3^2$, $\alpha_4^2$ and $\alpha_5^2$ are obtained by connecting squaring circuits 540, 542, 544, 546 and 548 to be responsive to the output signals from the accelerometers 354, 356, 358, 360 and 362, respectively. Adjustable potentiometers 550, 552, 554, 556 and 558 are connected in series circuit relationship with the squaring circuits 540, 542, 544, 546 and 548, respectively, in order to obtain the quantities $c_{51}$, $c_{52}$, $c_{53}$, $c_{54}$ and $c_{55}$, respectively.

The summation of the quantities $k_{51}\alpha_1$, $k_{52}\alpha_2$, $k_{53}\alpha_3$, $k_{54}\alpha_4$, $k_{55}\alpha_5$, $c_{51}\alpha_1^2$, $c_{52}\alpha_2^2$, $c_{53}\alpha_3^2$, $c_{54}\alpha_4^2$, and $c_{55}\alpha_5^2$ is obtained by connecting the adjustable potentiometers 530, 532, 534, 536, 538, 550, 552, 554, 556 and 558 to the input of a control summer 560 to thus produce at the output of the control summer 560 an output signal which is proportional to this last mentioned summation. A Q amplifier 562 is connected to be responsive to the output signal from the control summer 560 to thus effect a multiplication of the latter mentioned summation by the quantity $q$.

For the purpose of comparing the output signal of the load cell 340 with a signal which is proportional to the output signal from the Q amplifier 562, to thus obtain an error signal proportional to the difference in the two input signals, a summer 564 is provided. The error signal appearing at the output of the summer 564 is amplified by a servo amplifier 566 and is applied to the servomotor 330, to thus effect an upward lift on the region 310.

A weight correction factor for the weights 364, 366, 368, 370 and 372 can be effected by applying a positive or a negative weight correction signal to terminals 568, 570, 572, 574 and 576, respectively.

In operation, each of the bars 342, 344 and 346 in order to maintain an equilibrium flight should exert a certain downward force on the structure 300 at their respective regions 348, 350, and 352. The sum of these downward forces exerted by the bars 342, 344 and 346 on the structure 300 can be computed and this summation in the form of a command signal proportional to the summation is applied to a terminal 578. As illustrated, a summer 580 is responsive to an output signal from each of the load cells 374, 376 and 378, to thus produce at its output a signal proportional to the summation of the output signals from the load cells 374, 376, and 378. A comparator circuit or summer circuit 582 is connected to be responsive to the output signal from the summer 580 and also is responsive to the command signal applied to the terminal 578. If the sum of the input signals to the summer 580 is of lesser magnitude than the command signal applied to the terminal 578 a positive error signal is fed through an integrating device 584 to each of a plurality of summers 586, 588, 590, 592 and 594 so as to effect an increase in the lift on each of the cables 312, 314, 316, 318 and 320. Finally an equilibrium state is reached in which the output error signal from the comparator circuit 582 is at zero magnitude.

In operation, the integrating circuit 584 functions to introduce sufficient time delay to enable the output error signal from the comparator circuit 582 to make the necessary corrections.

In order to balance the downward forces exerted by the bars 344 and 346 on the respective regions 350 and 352, a summer 595 is connected so that its input is responsive to the output signals from the load cells 376 and 378. If the output signals from the load cells 376 and 378 are not of equal value an error signal appears at the output of the summer 595, which error signal is applied through an integrating device 596 to summers 597 and 598. In operation, the integrating device 596 functions to effect a sufficient time delay, to thus enable the output error signal from the summer 595 to effect a proper correction. In particular, if the output signal from the load cell 378 is of greater magnitude than the output signal from the load cell 376 a positive error signal appears at the output of this summer 595 which in going through a summer 599 is converted to a negative error signal which is applied to the summers 597 and 598. This error signal then produces at the output of the summers 597 and 598 negative and positive error signals, respectively, which are applied to summers 600 and 601, respectively. Such being the case, the lift on the cable 320 is decreased and the lift on the cable 318 is increased, thereby restoring the magnitudes of the output signals from the load cells 376 and 378 to equal values. On the other hand, if the output signal from the load cell 376 is of greater magnitude than the output signal from the load cell 378 a negative error signal appears at the output of the summer 595, to thus apply a positive signal to the input of the summers 597 and 598. Such an action effects the application of a positive signal to the summer 600 and a negative signal to the summer 601 to thus decrease the pull on the cable 318 and increase the pull on the cable 320, thereby restoring the magnitudes of the output signals from the load cells 376 and 378 to an equal value.

In order to obtain a proper balance between the sum of the downward forces exerted by the bars 344 and 346 on the structure 300 and the downward force exerted by the bar 342 on the structure 300, to thus maintain the structure 300 in equilibrium flight, a summer 602 is connected to be responsive to the difference between the output signal from the load cell 374 and the sum of the output signals from the load cells 376 and 378. If an unbalanced condition exists an error signal appears at the output of the summer 602, a measure of the error signal being fed through an integrating device 603 and the summers 597 and 598, to the summers 600 and 601 to thus make the necessary lift correction. In operation, the integrating device 603 functions to effect a sufficient time delay to enable the output error signal from the summer 602 to make the necessary lift correction.

If the output signal from the load cell 374 is of greater magnitude than the sum of the output signals from the load cells 376 and 378 a negative error signal appears at the output of the summer 602. Such being the case a positive error signal appears at the output of a summer 604 to thus increase the lift on the cables 318 and 320 to thereby restore the structure 300 to an equilibrium flight condition. On the other hand, if the sum of the output signals from the load cells 376 and 378 is of greater magnitude than the output signal from the load cell 374 a positive error signal appears at the output of the summer 602, to thus effect a negative signal to the summers 597 and 598, to thereby decrease the lift on the cables 318 and 320, thus restoring the structure 300 to an equilibrium flight condition.

The structure 300 can be put through an acceleration roll by applying a signal to a terminal 606 which is electrically connected to the input of the summer 599. If a positive signal is applied to the terminal 606 the lift on the cable 320 will be increased and the lift on the cable 318 will be decreased. On the other hand if a negative signal is applied to the terminal 606 the lift on the cable 320 will be decreased and the lift on the cable 318 increased.

In order to account for rolling velocity a control signal is applied to a terminal 610 which is electrically connected to the input of each of a plurality of summers 612, 614, 616 and 618. A surface control effect can also be obtained for each of the regions 304, 306, 308 and 310 by applying control surface signals to terminals 620, 622, 624, and 626 which are electrically connected to the input of their respective summers 628, 630, 632 and 634.

The pitch of the structure 300 is varied automatically when a weight change signal is introduced to terminal 644 which is electrically connected to the input of the summer 604. Thus according to the polarity of the signal applied to the terminal 644 the nose or pointed portion of the structure 300 will be raised upwardly or downwardly.

In order to simulate the heat conditions that are encountered under flight conditions heat lamps 646, 648, 650, 652, 654, are disposed adjacent the regions 302, 304, 306, 308 and 310, respectively, of the structure 300. The heat lamps 646, 648, 650, 652, and 654 are connected to be controlled in accordance with the deformation of the structure 300 at the respective regions 302, 304, 306, 308 and 310. Specifically, the input of a heat control device 655 is connected to be responsive to the output signal from the accelerometer 354, the output of the heat control device 655 being connected to control the heat lamp 646 in accordance with the output signal from the accelerometer 354. In operation, an increase in the deformation of the structure 300 at the region 302 results in an increase in the output signal from the accelerometer 354 and thus a decrease in the magnitude of the heat applied to the region 302 by the heat lamp 646. If the heat lamp 646 were disposed below the region 302 the heat control device 655 would have to be such as to effect an increase in the magnitude of the heat applied to the region 302 with an increase in the deformation at the region 302.

In like manner, the input of a heat control device 656 is connected to be responsive to the output signal from the accelerometer 356, the output of the heat control device 656 being connected to the heat lamp 648 in order to control the intensity of the heat applied to the region 304 in accordance with the output signal from the accelerometer 356. Here again, an increase in the output signal from the accelerometer 356 effects a decrease in the magnitude of the heat applied to the region 304.

Similarly, the input of a heat control device 658 is connected to be responsive to the output signal from the accelerometer 358, the output of the heat control device 658 being connected to the heat lamp 650 to control the magnitude of the heat output from the lamp 650 in accordance with the magnitude of the output signal from the accelerometer 358, specifically, an increase in the deformation of the region 306 results in a decrease in the magnitude of the heat applied to the region 306.

The control for the heat lamps 652 and 654 are similar and comprise heat control devices 660 and 662, respectively, which are connected to effect a decrease in the intensity of the heat applied to the respective regions 308 and 310 with an increase in the deformation of the structure 300 at the respective regions 308 and 310. As illustrated, the inputs of the heat control devices 660 and 662 are connected to be responsive to their respective accelerometers 360 and 362, the outputs of the heat control devices 660 and 662 being connected to control the operation of the heat lamps 652 and 654, respectively.

For the purpose of measuring the stress at various parts of the structure 300 strain gages (not shown) can be disposed at various locations on the structure 300.

The operation of the apparatus and circuits shown in FIG. 2 will now be briefly described. As hereinbefore mentioned, the summers 580, 595 and 602 in conjunction with other associated apparatus and circuits effect an equilibrium flight condition for the structure 300. Simultaneously with the establishment of this equilibrium flight condition the servomotors 322, 324, 326, 328 and 330 effect a lift at their respective regions 302, 304, 306, 308 and 310. As hereinbefore mentioned, the servomotors 322, 324, 326, 328 and 330 continue to effect a further upward lift on their respective regions 302, 304, 306, 308 and 310 until the error signals appearing at the outputs of their respective summers 414, 452, 490, 526 and 564 reach zero magnitude. Once these conditions have been reached and the summers 580, 595 and 602 have effected an equilibrium flight condition, the structure 300 is in a final deformed condition. At this time, the values of deformation at the regions 302, 304, 306, 308 and 310 can be read at the galvanometers 354', 356', 358', 360', and 362', and the values of lift at the respective regions 302, 304, 306, 308 and 310 can also be read at the respective galvanometers 332', 334', 336', 338' and 340'. Of course, these values of lift and deformation can also be obtained for other conditions in which for instance an acceleration roll signal is applied to the terminal 606, or a rolling velocity control signal is applied to the terminal 610, or a surface control signal is applied to the terminals 620, 622, 624 and 626. Likewise, values for stress at various parts of the structure 300 can be obtained for all of these flight conditions by means of strain gages of which only one, 670, is shown with a galvanometer 672 suitably connected thereto. Temperatures at various parts of the structure 300 can also be measured by apparatus not shown.

The apparatus and circuits embodying the teachings of this invention have several advantages. For instance, the necessary data can be obtained without a mathematical computation of the elastic influence coefficients since this is taken into account by the actual elastic physical structures 8 and 300. In addition, heat conditions under flight can be accurately simulated and the interaction of thermal deformations with aerodynamic loads can be investigated. Further, the actual physical structure of the airplane or model thereof can be visually observed under various flight conditions.

With apparatus built in accordance with the teachings of this invention non-linear solutions with forces proportional to the square of the angle of attack are easy to obtain as compared with other methods which are exceedingly difficult even with the most advanced computers available. Hypersonic flow, large deflections and inclusion of drag all make the problem non-linear.

Visual presentation of the data gives insight into the important parameters in thermoaeroelastic problems. Variation of aerodynamic and thermodynamic parameters is easily accomplished, and important effects can be singled out and studied in detail.

A structural representation of this kind allows direct presentation of applied loads and stresses, thereby eliminating additional computational work.

Since numerous changes may be made in the above apparatus and circuits and different embodiments may be made without departing from the spirit and scope thereof, it is intended that all matter contained in the foregoing description or shown in the accompanying drawings shall be interpreted as illustrative and not in a limiting sense.

I claim as my invention:

1. In apparatus for determining a physical characteristic of an inanimate deformable object, the combination comprising, loading means for applying a force to a region of said object to effect an angular displacement of said object, means for measuring the angular displacement of said object at said region, and means responsive to said measuring means for controlling said loading means in accordance with the angular displacement of said object at said region.

2. In apparatus for determining a physical characteristic of an inanimate deformable object, the combination comprising, loading means for applying a force to a region of said object to effect an angular displacement of said object, means for restraining physical movement of a portion of said object while permitting said loading means to effect an angular displacement of said object, means for measuring the angular displacement of said object at said region, and means responsive to said measuring means for controlling said loading means in accordance with the angular displacement of said object at said region.

3. In apparatus for determining a physical characteristic of an inanimate deformable object having a plurality of regions, the combination comprising, a separate loading means for each of said plurality of regions for applying a force to its respective region to effect a deformation of said object, separate means for each of said plurality of regions for measuring the deformation of said object at each of the respective regions, load responsive means for each of said plurality of reigons for obtaining an output which is a measure of the force applied to the respective region, a separate summer for each of said plurality of regions, circuit means for rendering each of said summers responsive to each of said measuring means to produce an output from each of said summers which is dependent upon the deformation of said object at each of said plurality of regions, and other circuit means for comparing the output from each of said summers with the output from its respective load responsive means to obtain an error signal and for applying said error signal to its respective loading means.

4. In apparatus for determining a physical characteristic of an inanimate deformable object having a plurality of regions, the combination comprising, a separate loading means for each of said plurality of regions for applying a force to its respective region to effect a deformation of said object, means for restraining physical movement of a portion of said object while permitting the plurality of loading means to effect a deformation of said object, separate means for each of said plurality of regions for measuring the deformation of said object at each of the respective regions, load responsive means for each of said plurality of regions for obtaining an output which is a measure of the force applied to the respective region, a separate summer for each of said plurality of regions, circuit means for rendering each of said summers responsive to each of said measuring means to produce an output from each of said summers which is dependent upon the deformation of said object at each of said plurality of regions, and circuit means for comparing the output from each of said summers with the output from its respective load responsive means to obtain an error signal and for applying said error signal to its respective loading means.

5. In apparatus for determining a physical characteristic of an inanimate deformable object, the combination comprising, control and support means for changing the angular position of said object and for so supporting said object as to restrain physical movement of a portion of said object, loading means for applying a force to a region of said object to effect a change in the angular position of said object, means for measuring the angular position of said object at said region, means responsive to said measuring means for controlling said loading means in accordance with the angular position of said object at said region, load responsive means for obtaining an output which is a measure of said force applied to said region, a comparison device for comparing said output with a predetermined command signal to obtain an error signal, and means for applying said error signal to said control and support means to control the angular position of said object in accordance with said error signal.

6. In apparatus for determining a physical characteristic of an inanimate deformable object having a plurality of regions, the combination comprising, control and support means for changing the angular position of said object and for so supporting said object as to restrain physical movement of a portion of said object, a separate loading means for each of said plurality of regions for applying a force to its respective region to effect a change in the angular position of said object, separate means for each of said plurality of regions for measuring the angular position of said object at each of the respective regions, means for rendering each of said loading means responsive to its respective measuring means for controlling each of said loading means in accordance with the angular position of said object at its respective region, load responsive means for each of said plurality of regions for obtaining an output which is a measure of the force applied to the respective region, a summer having an input and an output, the input of the summer being connected to be responsive to the output from each of said load responsive means, a comparator device connected to be responsive to the output of the summer for comparing the output from the summer with a predetermined command signal to thereby obtain an error signal, and means for applying said error signal to said control and support means to control the angular position of said object in accordance with said error signal.

7. In apparatus for determining a physical characteristic of an inanimate deformable object having a plurality of regions, the combination comprising, control and support means for changing the angular position of said object and for so supporting said object as to restrain physical movement of a portion of said object, a separate loading means for each of said plurality of regions for applying a force to its respective region to effect a change in the angular position of said object, separate means for each of said plurality of regions for measuring the angular position of said object at each of the respective regions, load responsive means for each of said plurality of regions for obtaining an output which is a measure of the force applied to the respective region, a separate summer for each of said plurality of regions, circuit means for rendering each of said summers responsive to each of said measuring means to produce an output from each of said summers which is dependent upon the angular position of said object at each of said plurality of regions, other circuit means for comparing the output from each of said summers with the output from its respective load responsive means to obtain an error signal and for applying said error signal to its respective loading means, another summer having an input and an output, the input of said another summer being connected to be responsive to the output from each of said load responsive means, a comparator device connected to be responsive to the output of said another summer for comparing the output from said another summer with a predetermined command signal, and means for applying said last mentioned error signal to said control and support means to control the angular position of said object in accordance with said last mentioned error signal.

8. In apparatus for determining a physical characteristic of an inanimate deformable object having a plurality of regions, the combination comprising, control and support means for changing the angular position of said object and for so supporting said object as to restrain physical movement of a portion of said object, a separate loading means for each of said plurality of regions for applying a force to its respective region to effect a change in the angular position of said object, separate means for each of said plurality of regions for measuring the angular position of said object at each of the respective regions, load responsive means for each of said plurality of regions for obtaining an output which is a measure of the force applied to the respective region, a separate summer for each of said plurality of regions, circuit means for rendering each of said summers responsive to each of said measuring means to produce an output from each of said summers which is dependent upon the angular position of said object at each of said plurality of regions, other circuit means for comparing the output from each of said summers with the output from its respective load responsive means to obtain an error signal and for applying said error signal to its respective loading means, another summer having an input and an output, the input of said another summer being connected to be responsive to the output from each of said load responsive means, torque means for obtaining a measure of the torque between said object and said control and support means, further circuit means interconnected between said torque means and said another summer for rendering the output of said another summer dependent upon said measure of the torque, a comparator device connected to be responsive to the output from said another summer for comparing the output from said another summer with a predetermined command signal and means for applying said last mentioned error signal to said control and support means to control the angular position of said object in accordance with said last mentioned error signal.

9. In apparatus for determining a physical characteristic of an inanimate deformable object having a plurality of regions, the combination comprising, a separate loading means for each of a part of said plurality of regions for applying a force to its respective region, connecting means disposed below said object, the upper end of said connecting means being connected to the remainder of said plurality of regions and the lower end of said connecting means being fixed so as to apply a force to each of said remainder of said plurality of regions while permitting the plurality of loading means to effect a deformation of said object, separate means for each of said part of said plurality of regions for measuring the deformation of said object at the respective region, circuit control means for rendering each of said loading means responsive to its respective measuring means for controlling each of said loading means in accordance with the deformation of said object at its respective region, and means connected to said circuit control means to control each of said loading means to thus control the magnitude of the upward force applied to each of said part of said plurality of regions to thereby control the magnitude of the force applied to each of said remainder of said plurality of regions.

10. In apparatus for determining a physical characteristic of an inanimate deformable object having a plurality of regions, the combination comprising, a separate loading means for each of a part of said plurality of regions for applying an upward force to its respective region, a plurality of structural members, one for each of the remainder of said plurality of regions, said members being disposed below said object with the upper end of each of said members being connected to its respective region and the lower end of said members being fixed so as to apply a force to its respective region while permitting the plurality of loading means to effect a deformation of said object, separate means for each of said part of said plurality of regions for measuring the deformation of said object at the respective region, load responsive means for each of said part of said plurality of regions for obtaining an output which is a measure of the force applied to its respective region, a separate summer for each of said part of said plurality of regions, circuit means for rendering each of said summers responsive to each of said measuring means to produce an output from each of said summers which is dependent upon the deformation of said object at each of said part of said plurality of regions, other circuit means for comparing the output from each of said summers with the output from its respective load responsive means to obtain an error signal and for applying said error signal to its respective loading means, and further circuit means for modifying the output from each of said measuring means to each of said summers to thus control the magnitude of the upward force applied to each of said part of said plurality of regions to thereby control the magnitude of the force applied to each of said remainder of said plurality of regions.

11. In apparatus for determining a physical characteristic of an inanimate deformable object having at least two control regions and a plurality of other regions, the combination comprising, a separate loading means for each of said two control regions and for each of a part of said plurality of other regions for applying a force to its respective region, three substantially vertical structural members, one for each of the remainder of said plurality of other regions, the three substantially vertical members being disposed below said object with the upper end of each of said members being connected to its respective region and the lower end of each of said members being fixed so as to apply a force to its respective region, two of the three substantially vertical members being disposed in one direction from the other of the three substantially vertical members and said two of the three substantially vertical members being disposed in another direction from one another while permitting the plurality of loading means to effect a deformation of said object, separate means for each of said two control regions and for each of said part of said plurality of other regions for measuring the deformation of said object at its respective region, load responsive means for each of said two control regions and for each of said part of said plurality of other regions for obtaining an output which is a measure of the force applied to its respective region, a separate control summer for each of said two control regions and for each of said part of said plurality of other regions, circuit means for rendering each of said control summers responsive to each of said deformation measuring means to produce an output from each of said control summers which is dependent upon the deformation of said object at each of said two control regions and at each of the regions of said part of said plurality of other regions, other circuit means for comparing the output from each of said control summers with the output from its respective load responsive means to obtain an error signal and for applying said error signal to its respective loading means, a separate load measuring device for each of said three members for obtaining an output which is a measure of the force applied by the respective substantially vertical member to its respective region, another summer connected to be controlled by the output from each of said load measuring devices to produce an output which is dependent upon the sum of the outputs from each of said load measuring devices, a comparator device for comparing the output from said another summer with a command signal to produce an error signal, further circuit means for modifying the output from each of said deformation measuring means in accordance with said last mentioned error signal, an additional summer connected to be controlled by the output from each of said load measuring devices to produce an output which is dependent upon the difference between the output from the load measuring device for said other of the three substantially vertical members and the sum of the outputs from the load measuring devices for said two of the three substantially vertical members, still other circuit means for modifying the output from each of said deformation measuring means of said two or more control regions in accordance with the output from said additional summer, a further summer connected to be controlled by the output from each of said load measuring devices of said two of the three substantially vertical members to produce an output which is dependent upon the difference between the outputs from each of said load measuring devices of said two of the three substantially vertical members, and still further circuit means for modifying the output from each of said deformation measuring means of said two control regions in accordance with the output from said further summer.

References Cited in the file of this patent
UNITED STATES PATENTS

| | | |
|---|---|---|
| 2,445,683 | Macgeorge | July 20, 1948 |
| 2,808,659 | Dehmel | Oct. 8, 1957 |
| 2,945,527 | Bower et al. | July 19, 1960 |